United States Patent
Liu

(10) Patent No.: US 8,085,152 B2
(45) Date of Patent: Dec. 27, 2011

(54) APPARATUS AND METHOD FOR AUTOMATICALLY SELECTING AND EXECUTING FILES ASSOCIATED WITH A USER

(75) Inventor: Qing-Hua Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 710 days.

(21) Appl. No.: 12/187,877

(22) Filed: Aug. 7, 2008

(65) Prior Publication Data

US 2009/0278695 A1    Nov. 12, 2009

(30) Foreign Application Priority Data

May 9, 2008   (CN) .......................... 2008 1 0301497

(51) Int. Cl.
*G08B 23/00*    (2006.01)

(52) U.S. Cl. ............... 340/573.1; 340/539.23; 340/10.1; 340/10.3; 713/182

(58) Field of Classification Search ............... 340/573.1, 340/572.1, 539.23, 5.8, 5.81, 5.74, 10.1, 340/10.3; 713/170, 182; 705/39, 40
See application file for complete search history.

(56) References Cited

U.S. PATENT DOCUMENTS

| | | | | |
|---|---|---|---|---|
| 5,629,981 | A * | 5/1997 | Nerlikar ........................ | 713/168 |
| 6,819,446 | B1 * | 11/2004 | Ogawa et al. ................ | 358/1.15 |
| 7,190,814 | B2 * | 3/2007 | Miichi et al. .................. | 382/118 |
| 7,310,162 | B2 * | 12/2007 | Morris-Jones ............... | 358/1.15 |
| 7,730,321 | B2 * | 6/2010 | Gasparini et al. ............ | 713/182 |
| 2002/0126054 | A1 * | 9/2002 | Fuerst et al. ................. | 343/712 |
| 2005/0168769 | A1 * | 8/2005 | Kim et al. .................... | 358/1.14 |

* cited by examiner

*Primary Examiner* — Hung T. Nguyen
(74) *Attorney, Agent, or Firm* — Altis Law Group, Inc.

(57) ABSTRACT

An apparatus includes a media player configured for executing stored files, and a sensor connected to the media player configured for perceiving a feature of a user who approaches the apparatus and transferring the feature to the media player. The media player plays files according to the feature perceived by the sensor.

5 Claims, 5 Drawing Sheets

APPARATUS AND METHOD FOR AUTOMATICALLY SELECTING AND EXECUTING FILES ASSOCIATED WITH A USER

BACKGROUND

1. Technical Field

The present invention relates to an apparatus and method for automatically selecting and executing files associated with a user.

2. Description of Related Art

A typical digital photo frame is capable of storing many different files such as photos and songs. However, what is displayed on the digital photo frame may be of interest to only a few users. For example, one user may be interested in viewing scenic photos while another user may be interested in listening to songs or viewing photos of family members. Some digital photo frames allow users to select the desired files. However, finding and selecting the desired files is complicated and inconvenient.

Therefore, an apparatus and method for automatically selecting and executing files associated with a user is desired to overcome the above-described shortcomings.

DETAILED DESCRIPTION OF THE EMBODIMENTS

Figure 1:
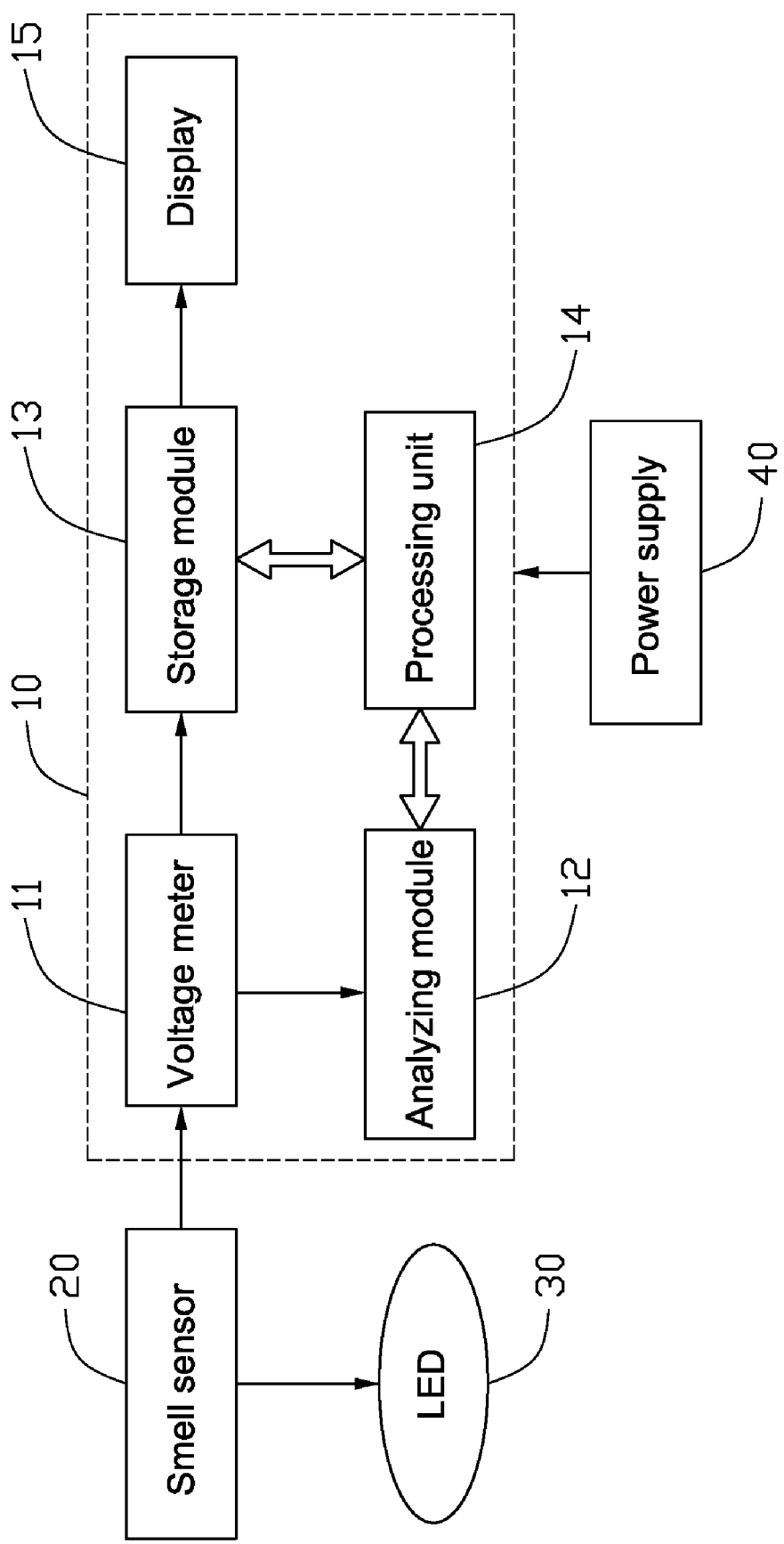
FIG. 1 is a block diagram of an embodiment of an apparatus for automatically selecting and executing files associated with a user.

Referring to FIG. 1, an embodiment of an apparatus for automatically selecting and executing files associated with a user, includes a media player 10, a smell sensor 20, a light emitting diode (LED) 30, and a power supply 40.

In one embodiment, the apparatus is a digital photo frame. The smell sensor 20 is configured for perceiving a unique pre-determined scent of a user approaching the digital photo frame and sending a signal corresponding to the scent to the media player 10. The media player 10 is configured to execute files associated with the scent. The LED 30 is connected to the smell sensor 20. When the smell sensor 20 perceives the pre-determined scent of the user, the LED 30 turns on to indicate that a recognized user has approached the apparatus. The power supply 40 supplies a working voltage to the apparatus. In other embodiments, other sensors capable of perceiving distinguishable features of users may be adopted.

The media player 10 includes a voltage meter 11, an analyzing module 12, a storage module 13 capable of storing files, a processing unit 14, and a display 15. The voltage meter 11 is configured to measure the voltage of the smell sensor 20 and transmit the voltage to the analyzing module 12. An input of the voltage meter 11 is connected to the smell sensor 20. An output of the voltage meter 11 is connected to the analyzing module 12. The processing unit 14 is connected between the analyzing module 12 and the storage module 13. The analyzing module 12 is configured for analyzing the voltage of the smell sensor 20 and finding files corresponding to the voltage. The processing unit 14 selects the files associated with the voltage. The display 15 executes the files selected by the processing unit 14.

The table below is an example showing the relationships between recognized users and files pre-selected by the user:

| Scent Source | Resistance Variation of the Smell Sensor | Voltage of the Smell Sensor | Matching files played by the Media Player |
| --- | --- | --- | --- |
| User 1 | R1 | U1 | Files 1 |
| User 2 | R2 | U2 | Files 2 |
| User 3 | R3 | U3 | Files 3 |
| User n | Rn | Un | Files n |

As illustrated in the table above, the scent of each user causes a unique resistance variation of the smell sensor 20, for example, resistance variation R1 for user 1. Accordingly, the voltage of the smell sensor 20 changes due to the resistance variation. The analyzing module 12 compares the voltage of the smell sensor 20 with stored voltage values, for example U1 for user 1, and selects the corresponding files, for example files 1 for user 1.

Figure 2:
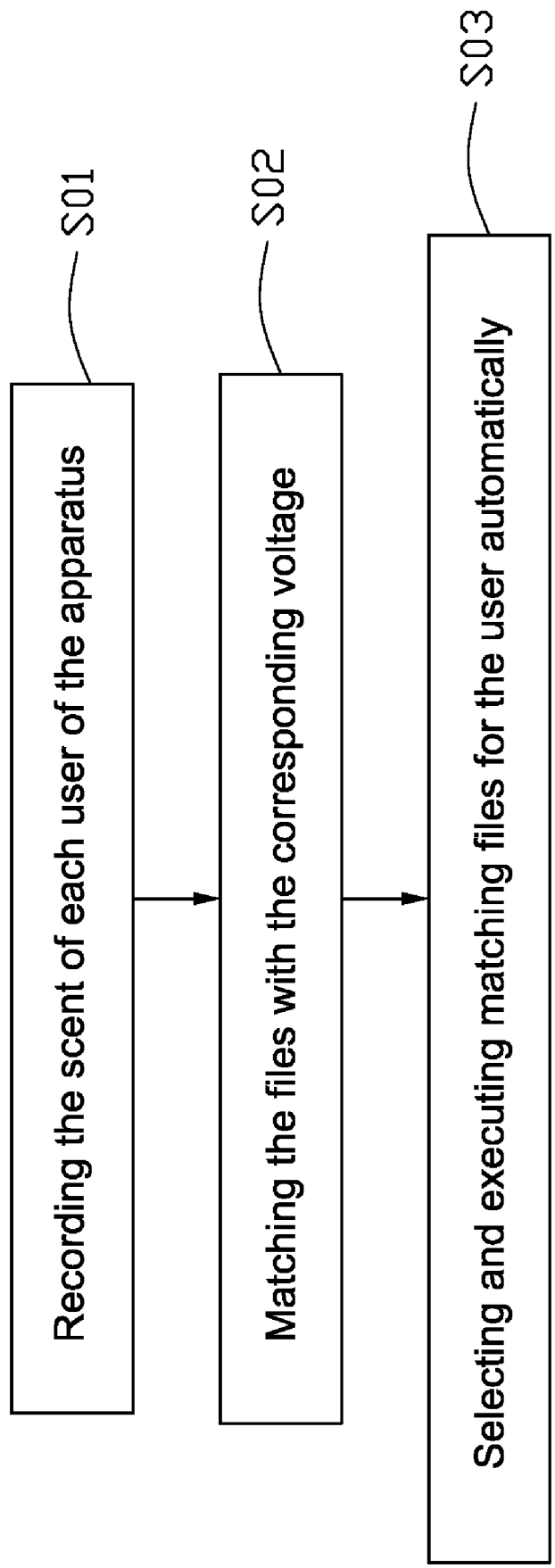
FIG. 2 is a flow chart of an embodiment of a method for automatically selecting and executing files associated with a user, the method including blocks S01, S02, and S03.

Referring to FIG. 2, a flowchart illustrates a method utilizing the above described apparatus for automatically selecting and executing files associated with a user. Depending on the embodiment, certain of the blocks described below may be removed, others may be added, and the sequence of blocks may be altered.

Figure 3:
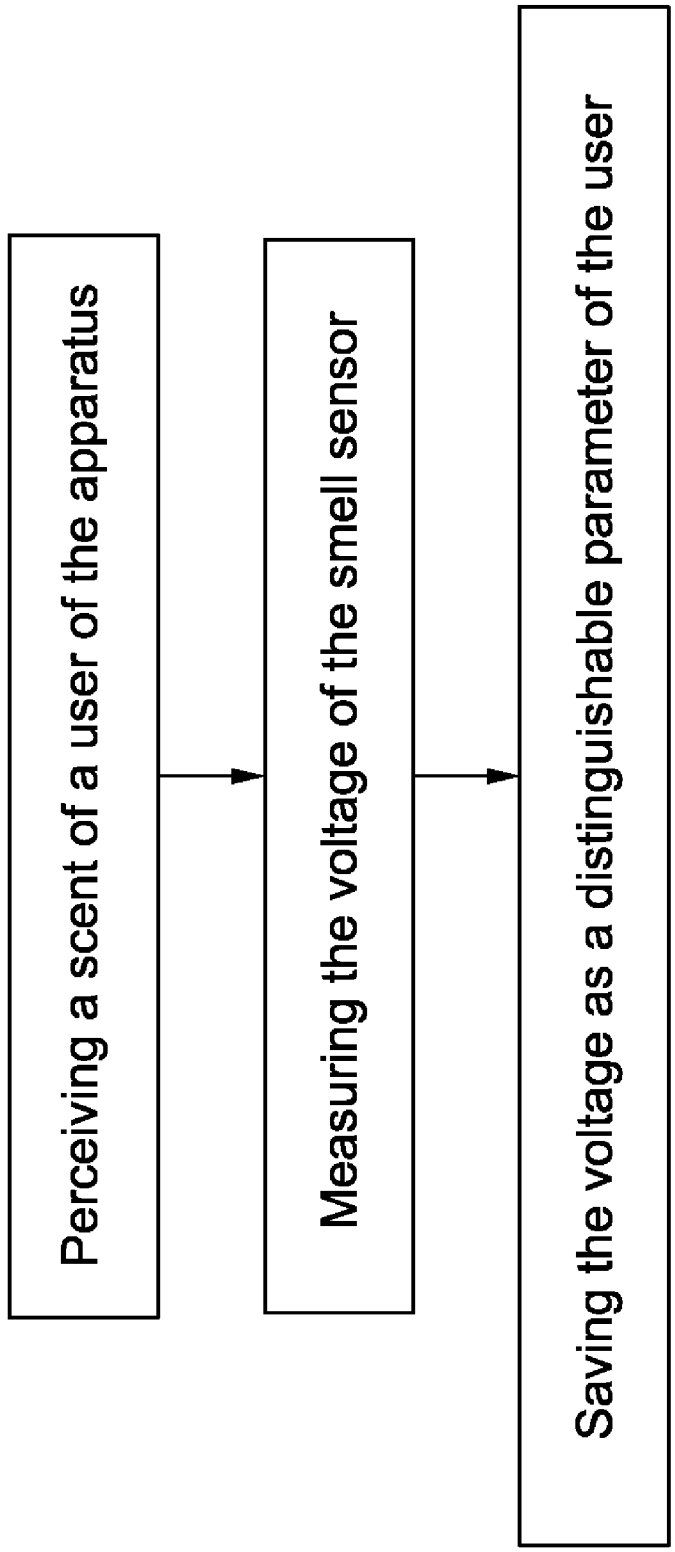
FIG. 3 is a detailed flow chart of block S01 of the method in FIG. 2.

In block S01, the apparatus records the scent of each user of the apparatus and the files selected by each user. FIG. 3 is a flow chart illustrating the blocks associated with block S01. The smell sensor 20 perceives a scent of a user and the voltage meter 11 measures the voltage of the smell sensor 20. Block S01 is repeated for each subsequent user, for example, user 2 and user 3.

Figure 4:
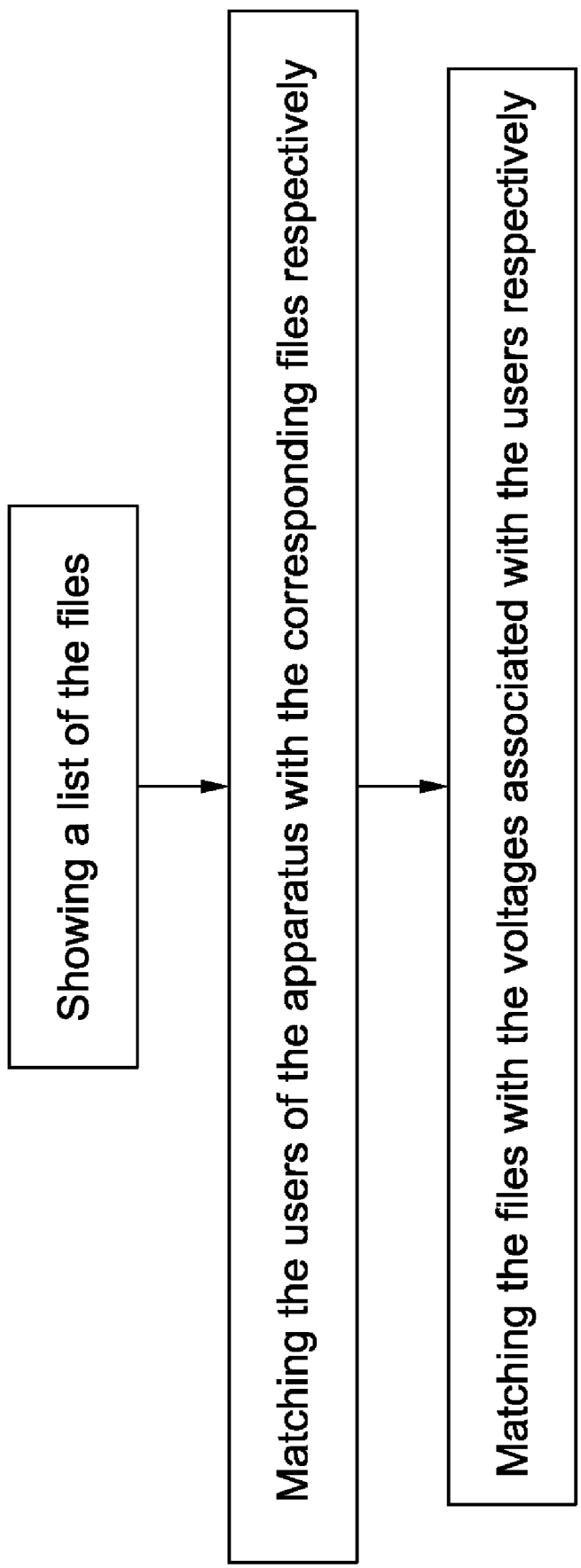
FIG. 4 is a detailed flow chart of block S02 of the method in FIG. 2.

In block S02, the selected files are matched to the corresponding voltage. FIG. 4 is a flowchart illustrating the blocks associated with block S02. A list of the files stored in the storage module 13 is displayed and may be selected by the user. The files are linked to the voltage of the smell sensor 20. For example, the first user selects picture and music files which are then grouped as files 1. A subsequent user, user 2, may also select picture and music files which are then grouped as files 2.

Figure 5:
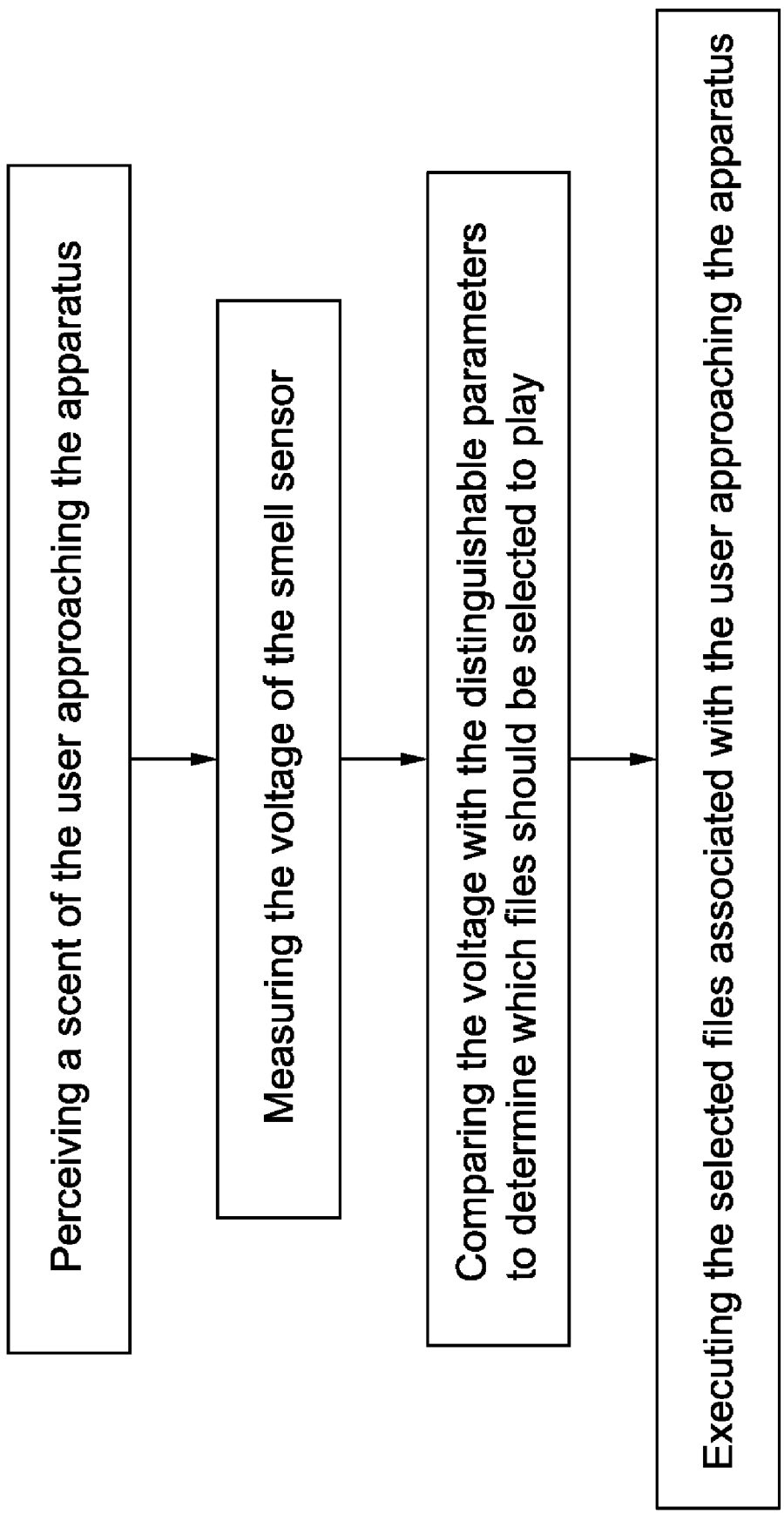
FIG. 5 is a detailed flow chart of block S03 of the method in FIG. 2.

In block S03, the apparatus automatically selects and executes matching files when the user is in the vicinity of the apparatus. FIG. 5 is a flow chart illustrating the blocks associated with block S03. The smell sensor 20 perceives a scent of the specific user approaching the apparatus. The resistance of the smell sensor 20 changes according to the scent. The voltage meter 11 measures the current voltage of the smell sensor 20. The apparatus executes the files of the corresponding group if the measured voltage is substantially equal to the stored voltage values.

It is to be understood, however, that even though numerous characteristics and advantages of the present embodiments have been set forth in the foregoing description, together with details of the structure and function of the embodiments, the disclosure is illustrative only, and changes may be made in detail, especially in matters of shape, size, and arrangement of parts within the principles of the embodiments to the full extent indicated by the broad general meaning of the terms in which the appended claims are expressed.

What is claimed is:

1. An apparatus comprising:
a media player comprising a plurality of files, the files being associated with a plurality of users of the apparatus; and
a sensor connected to the media player configured for perceiving a feature of each user who approaches the apparatus and transferring the feature to the media player, wherein the media player executes matching files for one of the plurality of users according to the feature perceived by the sensor;
wherein the sensor has a first resistance when a first one of the plurality of users approaches the media player, and has a second resistance, different from the first resistance when a second one of the plurality of users approaches the media player; the sensor is a smell sensor;
the media player further comprises an analyzing module configured to compare the feature perceived by the smell sensor to stored parameters and select the corresponding files, wherein the stored parameters comprise features recorded from the users; and a voltage meter configured to measure a voltage of the smell sensor, wherein the analyzing module is configured to compare the voltage of the smell sensor to the stored parameters.

2. The apparatus of claim 1, wherein the media player further comprises a storage module configured for storing the files, the files are associated with the stored parameters.

3. The apparatus of claim 1, wherein the media player further comprises a processing unit connected between the analyzing module and the storage module to select the matching files in the storage module to play.

4. The apparatus of claim 1, further comprising a light emitting diode connected to the sensor.

5. The apparatus of claim 1, wherein the apparatus is a digital photo frame.

* * * * *